Patented July 28, 1942

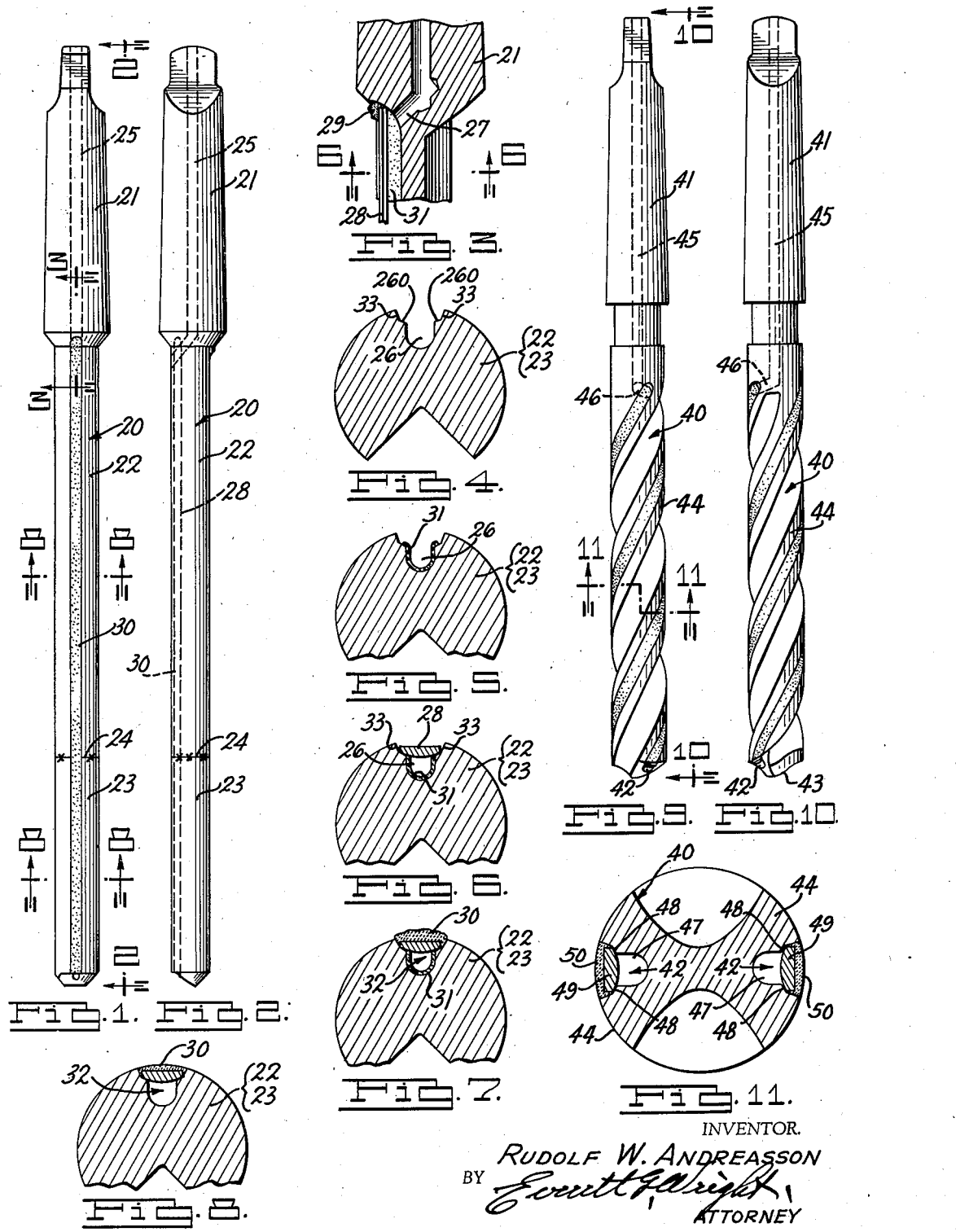

2,290,934

UNITED STATES PATENT OFFICE 2,290,934

METAL CUTTING TOOL

Rudolf W. Andreasson, Detroit, Mich.

Application March 28, 1942, Serial No. 436,687

2 Claims. (Cl. 76—108)

This invention relates to metal cutting tools such as drills and the like and in particular to a method and means for providing a fluid passage therethrough.

This application is a continuation-in-part of the co-pending application for patent of Rudolf W. Andreasson entitled Method of manufacturing metal cutting tools, Serial No. 412,779 filed September 29, 1941.

In gun drills and twist drills it is customary to provide a fluid passage longitudinally thereof through which cutting compound, lubricant and coolant is forced under pressure to the working end of the cutting tip. In other types of metal cutting tools fluid passages are provided for like purposes. Although the invention may be applied to various types of metal cutting tools having fluid passages therethrough, inasmuch as the invention is most applicable to gun drills and twist drills, it will be described with particular reference thereto.

In long gun drills and twist drills and particularly in small diameter gun drills and twist drills, it is extremely difficult and sometimes impossible to provide long longitudinal bores therethrough because the limited diameter of the stock available limits the diameter of the hole to be bored. Accordingly, long gun drills are ofttimes constructed of a solid shank drilled axially to communicate with a hollow shaft brazed or welded thereto, and onto the end of said shaft is brazed or welded a cutting tip axially bored to communicate with the hollow shaft, thus providing a continuous fluid passage from the top of the shank to the extreme end of the cutting tip. Heretofore, no fluid passage has been possible axially through twist drills of small diameters and long lengths because of lack of stock through which to drill or because of the impracticability of drilling long small diameter holes.

With the foregoing in view, the primary object of the invention is to provide a gun drill, twist drill or the like having an inexpensive and readily formed fluid passage from the top of the shank to the cutting tip thereof.

Another object of the invention is to provide an inexpensive and facile method for forming a fluid passage from the upper end of the shank to the cutting tip of long and small diameter gun and twist drills without adversely affecting the hardness or temper of the cutting edges thereof.

Another object of the invention is to provide a simple, effective and inexpensive method for providing a long or tortuous fluid passage through metal cutting tools and the like to the cutting tip or face thereof.

Other objects of the invention will become apparent by reference to the following detailed description taken in connection with the accompanying drawing, in which:

Fig. 1 is a side elevational view of a gun drill manufactured in accordance with the invention.

Fig. 2 is a side elevational view of the gun drill disclosed in Fig. 1 taken on the line 2—2 of Fig. 1.

Fig. 3 is an enlarged fragmentary longitudinal sectional view taken on the line 3—3 of Fig. 1 showing the gun drill bored, milled and prepared for brazing.

Fig. 4 is a greatly enlarged cross sectional view of the gun drill disclosed in Figs. 1 and 2 showing the slot milled longitudinally therein providing a continuous fluid passage and continuous bridge rod seats.

Fig. 5 is a greatly enlarged cross sectional view similar to Fig. 4 showing the fluid passage slot and bridge rod seats coated in accordance with the invention.

Fig. 6 is a greatly enlarged cross sectional view similar to Fig. 5 taken on the line 6—6 of Fig. 3 showing the gun drill having a bridge rod seated on the seats provided adjacent the top of the milled fluid passage slot therein ready for brazing.

Fig. 7 is a greatly enlarged cross sectional view of the gun drill similar to Fig. 6 except the bridge rod is securely brazed and the fluid passage permanently formed.

Fig. 8 is a greatly enlarged cross sectional view of the completed gun drill and cutting tip taken on the lines 8—8 of Fig. 1.

Fig. 9 is a side elevational view of a twist drill manufactured in accordance with the invention.

Fig. 10 is a side elevational view of the twist drill disclosed in Fig. 9 taken on the line 10—10 of Fig. 9.

Fig. 11 is a greatly enlarged cross sectional view of the twist drill disclosed in Figs. 9 and 10 taken on the line 11—11 of Fig. 9.

Referring now to the drawing wherein like numerals refer to like and corresponding parts throughout the several views, the illustrative embodiment of the invention disclosed in Figs. 1–8 inclusive comprises a gun drill generally designated by the numeral 20 having a tapered shank 21, a solid V-shaped shaft 22 preferably integral with the said tapered shank 21, and a hardened steel V-shaped cutting tip 23 butt welded to the bottom of the said shaft 22 as indicated by the reference numeral 24 in Figs. 1 and 2.

The tapered shank 21 of the gun drill 20 is preferably provided with an axial bore 25 and the said shaft 22 and cutting tip 23 have a longitudinal slot 26 milled therein. A diagonal bore 27 provides a passage communicating between the axial bore 25 in the tapered shank 21 and the upper end of the slot 26 formed in the said shaft 22. The said slot 26 is preferably U-shaped in cross section at its base and V-shaped in cross section at the upper portion with a seat 260 formed at each side thereof as best indicated in Fig. 4 to receive a relatively flat bridge rod or wire 28. The bridge rod or wire 28 held by any suitable manner in the slot 26 on the seats 260; for example, by tack brazing as indicated by the numeral 29 in Fig. 3, or by the use of clamps or jigs, not shown.

The bridge rod 28 is secured in its seated position in the top of the slot 26 by brazing on top and on each side thereof as indicated by the numeral 30 in Fig. 7, the said bridge rod 28 serving as a form to prevent the filling of brass or the like 30 from running down into the bottom of the said slot 26. The foregoing construction provides a continuous fluid passage from the top of the shank 21 of the gun drill 20 to the working end of the cutting tip 23 thereof. The protruding portion and surplus filler or brazing material 30 is removed by such means as cutting or grinding after which the surface of the drill is preferably polished.

Prior to placing the bridge rod or wire 28 in the slot 26 on the seats 260 as indicated in Fig. 6, the said slot 26 is lined or painted with a compound 31 such as carbon and graphite, or, carbon and a silica binder, or the like as indicated in Fig. 5 which serves as a form and filler below any interstices that may occur between the bridge rod or wire 28 and the side walls of the said slot 26, thus preventing any brazing material 30 from running down into the bottom of the said slot 26 and blocking the complete fluid passage 32. Any compound 31 which adheres to the faces 33 of the slot 26 or which becomes smeared onto the exposed upper portion and sides of the bridge rod or wire 28 is preferably buffed, scraped or wiped off therefrom before brazing.

Obviously, a wide range of shapes of the slot 26 and the bridge rod or wire 28 can be used in practicing the invention. By employing the coating compound 31, the minute interstices between the bridge rod or wire 28 and the seats 260 are effectively closed. The coating compound 31 is preferably a carbon-graphite composition which adheres to the walls of the slot 26 and, in addition to filling the minute interstices between the bridge rod or wire 28 and the seats 260, serves to prevent any brazing material which might possibly leak into the slot 26 during brazing from adhering thereto. After brazing, the carbon-graphite lining 31 is blown or washed out together with any brazing material that may have run through into the completed fluid passage 32, which brazing material, because of the presence of the carbon-graphite lining 31, takes the form of little globules easily washed or blown out from the said completed fluid passage 32.

It will be noted that the bridge rod or wire 28 actually seats on the side walls of the slot 26, and that chips and the like cannot possibly force the bridge rod or wire 28 to the bottom of the slot 26 during use.

Figs. 9 to 11 inclusive show a twist drill 40 having a tapered shank 41 provided with tortuous fluid passages 42 extending from the cutting tip 43 up the outside face of the twisted shaft 44 and communicating with an axial bore 45 in the tapered shank 41 by means of a diagonal bore 46. Each of the said tortuous fluid passages 42 comprises a milled slot 47 having the top thereof flared to form seats 48 onto which a bridge rod or wire 49 is seated and brazed in place by suitable brazing 50 in a like and similar manner to the method hereinbefore described in connection with the gun drill shown in Figs. 1 to 8 inclusive; the tortuous fluid passages 42 being preferably lined with a carbon-graphite coating compound prior to positioning the bridge rod or wire 49 thereover and brazing, which coating compound is subsequently removed by forcing air or water through the said fluid passages.

By employing a bridge rod or wire 28 and 49 in the top of the slots 26 and 47 respectively much less brazing material 29 and 50 is required than if the top of the slot 26 and 47 were completely filled with brazing material, thus cutting down the temperature to which the metal of the cutting tool is raised by the process of brazing thereby being assured that no deleterious annealing of the cutting edges of the metal cutting tool will occur during the providing of a longitudinal fluid passage therethrough in the manner hereinbefore described.

Although but two embodiments of the invention and a single method of practicing the invention have been disclosed and described in detail, it is obvious that many changes may be made in the size, shape, arrangement and detail of the elements of the invention and in the method of practicing the same without departing from the spirit of the invention as defined by the appended claims.

I claim:

1. The method of providing a fluid supply passage in cutting tools comprising the steps of milling a slot in said tool wider at the surface of the tool than at the base of said slot and simultaneously forming continuous seats in the side walls of the said slot, disposing a relatively flat bridge rod wider than the narrowest portion of said slot in the top of said slot supported laterally on said seats, coating the said slot prior to seating said bridge rod on said seats with a non-hardening material serving as high temperature sealing means for interstices between said bridge rod and the sides of said slot, holding said bridge rod in said seated position, removing said coating material from said bridge rod and the sides of said slot above said seats, brazing said bridge rod to said tool while seated on said seats by filling the groove on each side of said bridge rod between said bridge rod and said tool and covering said bridge rod with the material employed, removing the portion of said brazing material disposed above the surface of said tool, and removing said coating material from within the completed fluid supply passage.

2. The method of providing a fluid supply passage in cutting tools comprising the steps of milling a slot in said tool wider at the surface of the tool than at the base of said slot and simultaneously forming continuous seats in the side walls of the said slot, disposing a relatively flat bridge rod wider than the narrowest portion of said slot in the top of said slot supported laterally on said seats, coating the said slot prior to seating said bridge rod on said seats with a carbon-graphite composition serving as sealing means for interstices between said bridge rod and the sides of said slot, holding said bridge rod in said seated position, removing said coating material from said bridge rod and the sides of said slot above said seats, brazing said bridge rod to said tool while seated on said seats by filling the groove on each side of said bridge rod between said bridge rod and said tool and covering said bridge rod with the material employed, removing the portion of said brazing material disposed above the surface of said tool, and removing said coating material from within the completed fluid supply passage.

RUDOLF W. ANDREASSON.